Figure 1:
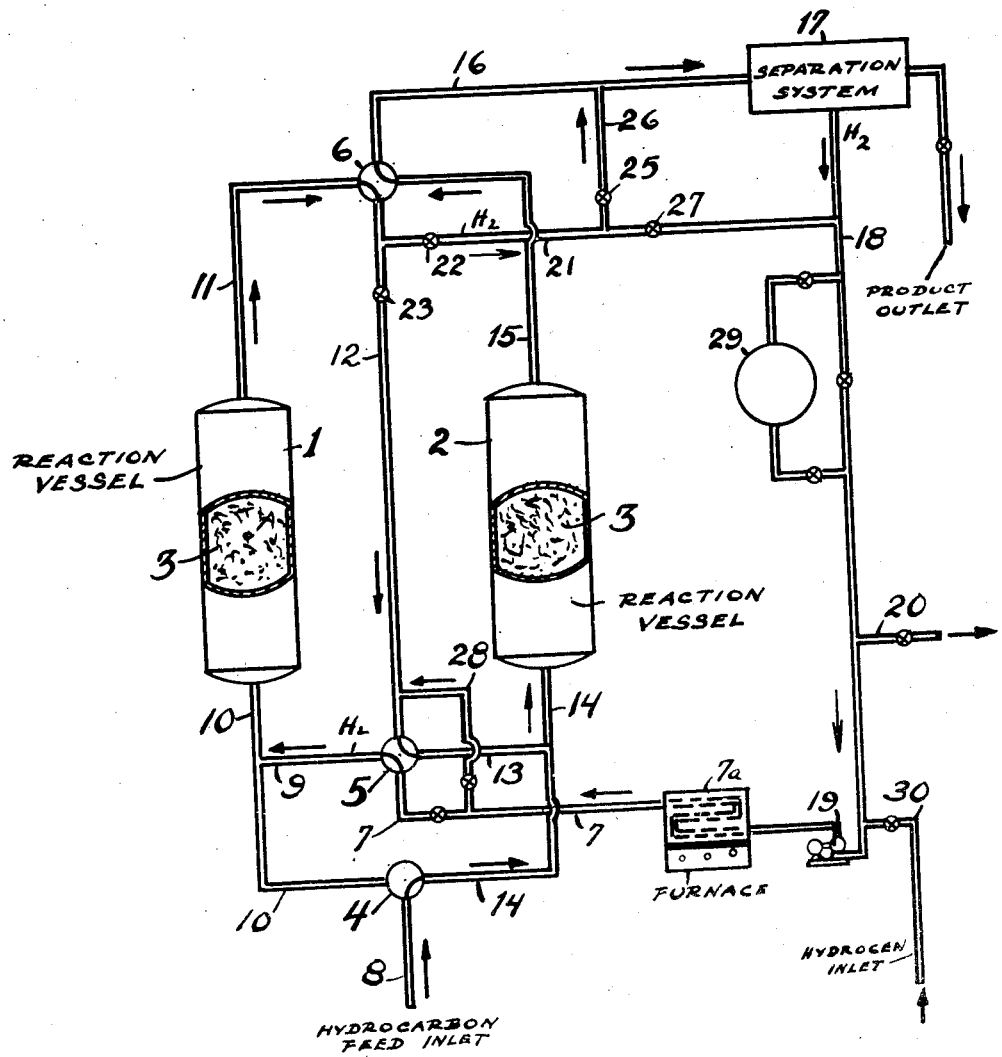

June 14, 1949.

J. C. MUNDAY ET AL 2,472,844

MAINTENANCE OF CATALYST ACTIVITY IN
HYDROCARBON CONVERSION PROCESSES

Filed June 25, 1942

2 Sheets-Sheet 2

John C. Munday Inventors
Edward W. S. Nicholson
By J. L. Young Attorney

Patented June 14, 1949

2,472,844

UNITED STATES PATENT OFFICE 2,472,844

MAINTENANCE OF CATALYST ACTIVITY IN HYDROCARBON CONVERSION PROCESSES

John C. Munday, Cranford, N. J., and Edward W. S. Nicholson, Baton Rouge, La., assignors to Standard Oil Development Company, a corporation of Delaware Application June 25, 1942, Serial No. 448,338

6 Claims. (Cl. 196—50)

This invention relates to processes for the catalytic conversion of hydrocarbons and is more particularly concerned with improved methods of operating such processes by means of which products of superior characteristics are obtained and the catalyst can be used for substantially longer periods before requiring replacement, remanufacture or regeneration by treatment with oxygen-containing gases.

The invention is applicable to those types of catalytic conversion processes in which the activity of the catalyst is gradually reduced by the formation or deposition thereon of carbonaceous contaminants such as coke. As examples of such processes may be mentioned catalytic cracking, catalytic reforming, catalytic dehydrogenation and catalytic aromatization whether or not carried out in the presence of substantial quantities of added or recirculated hydrogen or gases containing free hydrogen. The catalysts used in these processes ordinarily consist of silica, alumina, magnesia, or activated clays of the bentonitic or montmorillonitic types used alone, in various mixtures with each other or in combination with minor amounts, say from 1 to 50% by weight of oxides or sulfides of metals of the IV, V, VI and VIII groups of the periodic system.

Processes in which catalysts of this kind are used are characterized by alternate periods of reaction and regeneration, or reactivation of the catalyst. The reaction portion of a cycle is continued until the deposition of carbonaceous material on the catalyst has reduced the activity to such an extent that a product of the desired characteristics is no longer obtained or until the conversion falls below an economic level. The flow of hydrocarbon oil over the catalyst is then stopped and the catalyst is subjected to a regeneration treatment. The nature of the carbonaceous deposits in these high temperature reactions does not allow a mild regenerative treatment such as solvent extraction or vaporization, as might be practiced in polymerization and Fischer synthesis reactions. In the present case a more drastic treatment such as burning the coke and carbonaceous contaminants by means of air or air diluted with inert gases is required, usually at relatively frequent intervals.

The length of time the catalyst can be used before it requires regeneration treatment depends upon a number of factors, particularly the nature of the reaction, the character of the feed stock, the severity of the operating conditions, the presence or absence of substantial quantities of hydrogen during the reaction and the type of catalyst. Thus, in the catalytic cracking of gas oils at temperatures between 850 and 1000° F. in the presence of fixed beds of catalysts consisting essentially of a mixture of silica and alumina the length of the reaction portion of a cycle may be from 2 minutes to 2 hours or more. In the catalytic reforming of naphthas in the presence of catalysts consisting of a major proportion of alumina and a minor proportion of an oxide of a metal of the VI group of the periodic system the length of the reaction portion of the cycle may be from 1 to 3 hours or more. When these processes are conducted under pressure and in the presence of substantial quantities of added or recirculated gases containing free hydrogen the length of the reaction portion of a cycle may be considerably longer because the presence of free hydrogen tends to retard the deposition of coke on the catalyst. Thus in catalytic reforming in the presence of hydrogen the reaction portion of a cycle may be from 2 to 20 hours or more. When employing finely divided catalysts in these processes the reaction portion of the cycle is generally considerably shorter.

We have now found that better results are obtained in these catalytic conversion processes and that the necessity for regeneration with air or other oxygen-containing gases is less frequent if the catalyst during the reaction portion of the cycle is subjected to frequent and intermittent treatments with hydrogen. Pure hydrogen or gases rich in free hydrogen, such as those produced in the process may be used, in such a manner that the partial pressure of hydrogen in contact with the catalyst is increased intermittently to a substantial degree. For example, the catalyst may be subjected to a treatment with hydrogen in the absence of the feed stock at intervals of from a fraction of a second to 15 minutes, 1 hour or more. Thus, in catalytic reforming the hydrocarbon oil vapors may be passed over the catalyst for a period of say 1 minute and then hydrogen may be passed over the catalyst in the absence of oil vapors for a period of 1 minute. It is found that by operating in this manner the rate at which coke builds up on the catalyst is substantially reduced and furthermore, that the products obtained are greatly improved in quality by reason of the fact that they are produced in the substantial absence of coke.

The mechanism by which the deposition of coke is reduced and the catalyst is reactivated by the hydrogen treatment may be that high molecular weight polymers of unsaturated hydrocarbons which accumulate on the catalyst during the on-stream period are converted to volatile hydrocarbons by hydrogenation. An important element of the invention is that the elapsed time between hydrogen treatments should be relatively short, so that the heavy polymers are not allowed to "stew" on the catalyst and thereby become converted by dehydrogenation and polymerization to still more difficultly volatilizable materials. Whatever the exact mechanism may be, it is an experimentally determined fact that the effectiveness of the hydrogen reactivation treatment is in indirect relationship to the on-stream time between treatments. In the catalytic reforming of naphtha in the presence of hydrogen, a much greater effect is obtained when the catalyst is treated with hydrogen at intervals of a few minutes or less than at intervals of an hour or more. It should be understood, however, that such examples are given to illustrate rather than to limit the invention, since obviously the exact frequency with which the catalyst should be subjected to the reactivation treatment depends on a number of factors such as the nature of the feedstock, the character of the catalyst, temperature and pressure levels, feed rate, and the presence of coke-reducing gases such as hydrogen during reaction.

The intermittent type of operation according to the invention may be applied either to fixed bed operation in which the catalyst is stationary inside the reaction chamber or to powdered catalyst operation in which moving finely divided particles of catalyst are employed.

There are several different ways in which the intermittent operation may be carried out. One method is to maintain a circulating stream of hydrogen or hydrogen-containing gas passing through the catalyst and to inject the oil vapors into this stream for periodic short intervals. Another method is to feed hydrocarbon oil vapors and hydrogen alternately for short periods to the reaction zone. These methods may be used when employing a fixed bed of granular or pelleted catalyst or when a mass of finely divided catalyst is maintained for a considerable period of time within the reaction zone. The second method of operation is particularly useful in carrying out reactions such as dehydrogenation in which the simultaneous presence of oil vapors and hydrogen may be undesirable because the hydrogen has an adverse effect on the equilibrium of the reaction. A third method is to circulate finely divided catalyst continuously through reaction and hydrogen reactivation zones.

Figure 2:
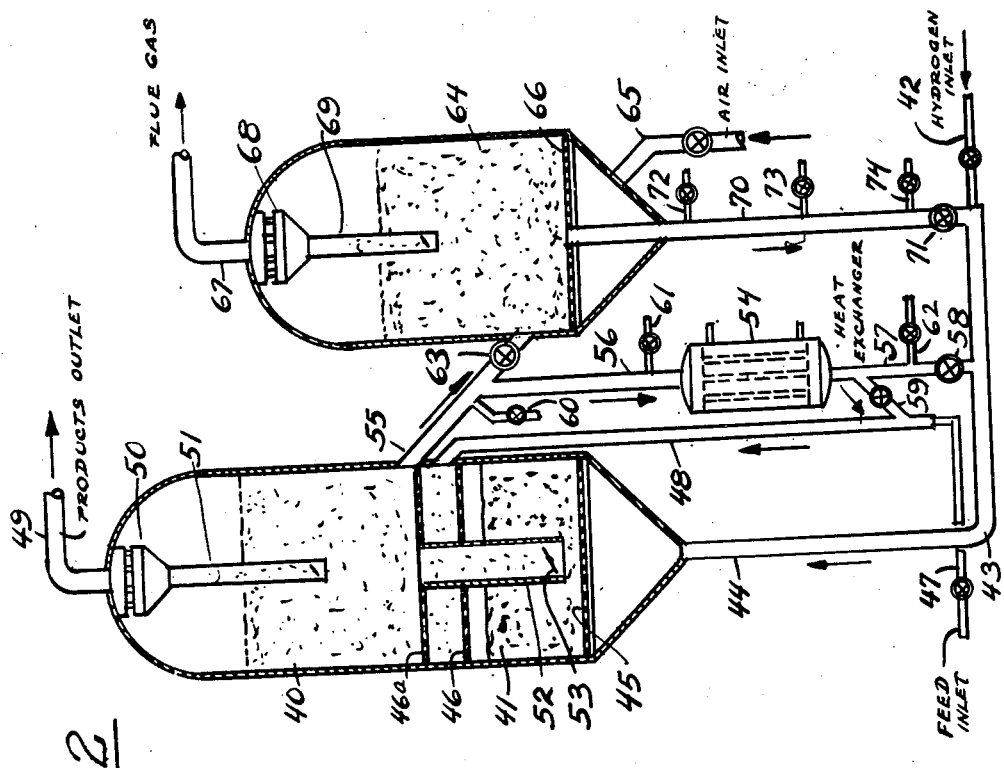

The method of carrying out the invention will be more fully understood from the following description when read with reference to the accompanying drawings which are semi-diagrammatic views in sectional elevation of three different types of apparatus in which the process may be carried out and in which Figure 1 illustrates a type of apparatus which may be used when hydrogen is continuously passed through a bed or mass of catalyst and oil vapors are passed intermittently therethrough, or when oil vapors and hydrogen are passed alternately therethrough; and Figure 2 illustrates a type of apparatus which may be used when oil vapors and hydrogen are passed continuously through zones containing finely divided catalyst which is circulated between the zones.

Referring to Figure 1, numerals 1 and 2 designate two reaction vessels containing a catalyst 3. Numerals 4, 5 and 6 designate multi-way valves. Valve 4 can have one blank side, as shown. Hydrogen is supplied from any suitable source through line 7, being preheated in furnace 7a. Hydrocarbon oil is supplied from any suitable source through line 8 and may be vaporized or preheated in any suitable heating means (not shown).

When valves 4, 5 and 6 are in the position shown, hydrogen supplied through line 7 passes through 4-way valve 5 and lines 9 and 10 into reaction vessel 1. No oil vapors pass through reaction vessel 1 because 4-way valve 4 is in the position shown. After passing through reaction vessel 1 wherein it reactivates the catalyst, the hydrogen flows through line 11, 4-way valve 6, line 12 and 4-way valve 5 and then enters reaction vessel 2 through lines 13 and 14. Meanwhile oil vapors are being supplied to reaction vessel 2 through line 8, valve 4 and line 14. A mixture of oil vapors and hydrogen thus passes through reaction vessel 2. Reaction products leave reaction vessel 2 through line 15, pass through 4-way valve 6 and then flow through line 16 to cooling, separating and fractionating equipment indicated at 17. Hydrogen recovered in the product separation system is recycled to line 7 through line 18, pump 19 and furnace 7a, or can be withdrawn through line 20. Extraneous hydrogen may be supplied through line 30, for example, in starting up the plant.

If short periods are employed, the hydrogen withdrawn from the catalyst undergoing reactivation in 1 may contain a considerable quantity of hydrocarbon vapors, which it may be desirable to remove before passing the hydrogen to the other catalyst bed wherein the reaction is occurring. In this case the hydrogen stream may be passed from valve 6 through line 12, valve 22, line 21, valve 25 and lines 26 and 16 to the product separation system 17, valves 23 and 27 being closed. The separated hydrogen is then passed through line 18, pump 19, furnace 7a and line 7, and a portion thereof is passed to reaction vessel 2 by means of line 28, line 12, valve 5 and lines 13 and 14, while another portion is passed to reaction vessel 1 through valve 5 and lines 9 and 10. If desired, the hydrogen may be purified separately from the products in equipment 29, which may take the form of an oil scrubber, or the hydrogen recovered from the separation system 17 may be purified to a further degree therein, before being passed to the reaction vessels.

After oil vapors have flowed through reaction vessel 2 for a short period, say about 1 minute, valves 4, 5 and 6 are simultaneously rotated one-quarter turn. This step changes the relative position of the reaction vessels 1 and 2, so that the catalyst in reaction vessel 1 is now employed for conversion of the oil and the catalyst in reaction vessel 2 is now subjected to the hydrogen reactivation treatment.

This equipment may be employed with fixed bed catalyst or with finely divided catalyst. When employing a powder of about 200–400 mesh, it is preferred to install a cyclone separator in the upper portion of each reaction vessel to recover catalyst from the gas, and to return the separated catalyst to the reaction zone through a pipe which dips below the level of powder therein, for example as shown in Figure 2. Vapor velocities in this case should be relatively low, for example less than 2–3 feet per second in the reaction vessels, whereupon catalyst loss is relatively slight. Make-up catalyst is added as required.

After operating in this intermittent manner for a prolonged period, the catalyst 3 in reaction vessels 1 and 2 may require an oxidative regeneration to remove coke which has slowly been accumulating. Regeneration may be accomplished in the usual way by purging the reactor of hydrocarbon gases and hydrogen and then passing air or inert gases containing regulated small quantities of oxygen through the catalyst 3 to cause combustion of the coke. Hence in order to permit continuous operation, multiple pairs of reaction vessels 1 and 2 may be provided so that while the catalyst in one pair is being regenerated, other pairs may be on stream.

The second modification wherein oil vapors and hydrogen are passed alternately in contact with the catalyst will now be described with reference to Figure 1. Hydrogen from line 7 is passed through 4-way valve 5, lines 9 and 10, and into reaction vessel 1 where it reactivates catalyst 3, and is withdrawn through line 11 and 4-way valve 6, as before. In this modification, however, the hydrogen stream is not passed to reaction vessel 2 but is recycled to reaction vessel 1. The hydrogen flowing through line 21 may be passed directly to the reaction vessel 1 through line 18, pump 19, furnace 7a and line 7, or it may first be purified in the product separation system 17 and/or in purification equipment 29 as described above.

Meanwhile, oil vapors are being supplied to reaction vessel 2 through line 8, valve 4 and line 14. Reaction products leave reaction vessel 2 through line 15, and are passed through 4-way valve 6 and line 16 to the cooling, separating and fractionating equipment indicated at 17.

After operating in this manner for a short period, valves 4, 5 and 6 are simultaneously rotated one-quarter turn. This changes the relative positions of reaction vessels 1 and 2, so that the catalyst in reaction vessel 1 is now employed for the conversion of the oil while the catalyst in reaction vessel 2 is subjected to hydrogen reactivation treatment. It will be seen that while the flow of oil and of hydrogen is continuous, the catalyst is subjected alternately to contact with oil and with hydrogen.

When the process described above is applied to endothermic reactions such as dehydrogenation and catalytic reforming in the presence of hydrogen, there is an added advantage in that the hydrogen can be employed as a source of heat. Hydrogen supplied through line 7 to the catalyst being reactivated can first be heated to a high temperature in furnace 7a, whereby the catalyst following a reaction portion of the cycle can be restored to the desired reaction temperature, or even higher if it is desired to introduce the feed stock at a relatively low temperature in order to avoid thermal decomposition in the preheating or vaporizing coil.

Referring to Figure 2, the apparatus illustrated is adapted for a type of powdered catalyst operation which may be called "fluid catalyst operation" applied particularly to the catalytic reforming of naphtha in the presence of hydrogen. In "fluid catalyst operation" the finely divided catalyst is suspended or at least slightly dispersed in oil vapors or other gases, and the relative proportions of catalyst and gas and the linear velocity of the gas are such that the mixture behaves in much the same way as a fluid and may be pumped and circulated through the apparatus in the same manner as a fluid.

In Figure 2, numerals 40 and 41 designate zones which are employed for reaction and for hydrogen reactivation of the catalyst, respectively. Hydrogen or a hydrogen-rich stream supplied through line 42 is passed through lines 43 and 44 into the bottom of reactivation zone 41, and thence through distribution grid 45 into contact with the catalyst in zone 41. Hydrogen and entrained reactivated catalyst are removed overhead and pass through grids 46 and 46a into reaction zone 40.

The feed stock to the reaction zone 40 is supplied through lines 47 and 48 and is passed through distribution grid 46a together with the hydrogen and suspended reactivated catalyst into reaction zone 40. The space between reactivation zone 41 and grid 46a constitutes a mixing zone, and in some cases grid 46 is not required. Products of the reaction in admixture with hydrogen are removed overhead through line 49 after passing through cyclone separators 50 wherein entrained catalyst particles are separated from the vapors. Catalyst recovered in cyclone 50 is returned to the reaction zone through pipe 51. To prevent by-passing of vapors through pipe 51, this pipe may extend below the level of powder in reaction zone 40, whereby the powder acts as a seal against the vapors. The product vapors are passed to separating and refining equipment (not shown) similar to that described in connection with Figure 1, where a hydrogen-rich fraction is separated for recycling to reactivation zone 41 and where the desired product fraction is segregated.

Catalyst is recycled from reaction zone 40 to reactivation zone 41 through standpipe 52 controlled by valve 53. It is preferred to maintain a relatively high catalyst recirculation rate so that the time of residence of the catalyst in reaction zone 40 is relatively short before it is transferred to the reactivation zone 41. The catalyst in the standpipe 52 is maintained in a fluidized condition by the presence of fluidizing gas, which in the case of short standpipes and short hold-up times therein can be entrained gas. However, in case the hold-up time in the standpipe is sufficient to allow deaeration, a fluidizing gas such as hydrogen or an inert gas may be introduced into the standpipe through a line (not shown) in order to maintain the catalyst in a fluidized condition. The use of hydrogen as a fluidizing gas has an advantage in that the catalyst withdrawn from the reaction zone is immediately subjected to reactivation conditions, the relative amounts of reactivation occurring in the standpipe and in zone 41, depending on the relative times of contact therein.

The finely divided catalyst in reaction and reactivation zones 40 and 41 respectively is preferably maintained as a highly turbulent, fluidized mass which is relatively dense as compared to a suspension. At low vapor velocities such as a few tenths of a foot per second to three or four feet per second, the mass may be said to have a definite level. The mass has the appearance of a boiling liquid by reason of the passage therethrough of bubbles of vapor or of catalyst-vapor suspension, while above the level there is a suspension of catalyst in vapor. At the higher velocities such as four or five feet per second, the level becomes less well defined, and it may disappear entirely at velocities of eight or ten feet per second or more.

Reaction zones of this type are called hindered settlers in order to distinguish them from suspension reaction zones wherein the tendency of the finely divided solid to settle out of the vapors is much less pronounced. Due to the continuous churning action in hindered settling zones, the temperature is practically constant throughout, even when endothermic or exothermic reactions are being carried out. A further advantage is the ease with which the temperature may be controlled by the addition of hot or cold catalyst streams thereto. For example, the naphtha or other hydrocarbon feed stock may be introduced into the reactor as a relatively cool vapor or liquid, and catalyst from a regenerator or a supplementary heater may be introduced at a relatively high temperature, yet the temperature in the reaction zone may vary throughout by no more than 5° or 10° F.

The density of the catalyst mass in such hindered settling zones, and the amount of catalyst carried out with the vapors, depend on a number of factors such as the velocity of the vapors, the specific density of the catalyst, the size of the particles, the rate of catalyst addition and the free settling space in the upper portion of the zone. When employing catalyst most of which is in the particle size range of from 200 to 400 mesh and has a bulk density when freely settled of about 40–70 pounds per cubic foot, the linear upward velocity through the reactor may be from 0.5 to 10.0 feet per second and the catalyst density in the reactor may be from 5 to 35 pounds per cubic foot. In general, the higher catalyst densities are preferred since higher conversions are effected thereby.

The catalyst carry-over with the vapors leaving reaction zone 40 may be of the order of a few thousandths of a pound per cubic foot if the flow is in the low velocity range, for example less than about 1 or 2 feet per second, and if a free settling space of about 5–15 feet is allowed above the relatively dense catalyst phase. The catalyst loading of the gases passing from the reactivation zone 41 to the reaction zone 40, however, may be considerably higher; this depends to a large extent on the catalyst flow rate to zone 41 through standpipe 52, by which the free settling space in the upper portion of zone 41 may be controlled.

The temperature in zones 40 and 41 may be maintained as desired by controlling the temperature of the streams passing thereto. For example, the temperature of the hydrogen supplied through line 42 and of the feed stock supplied through line 47 can be controlled so that zones 40 and 41 are maintained at the desired temperature levels. The temperature in zone 41 can be maintained higher than the temperature in reaction zone 40 in order to increase the efficiency of reactivation and also to supply heat of reaction by means of hot hydrogen introduced through line 42. Another means of temperature control comprises passing a stream of fluidized catalyst through heat exchanger 54 and thence into zone 40 and/or 41. This fluidized catalyst stream may be withdrawn from reaction zone 40 and passed through standpipes 55 and 56 to heat exchanger 54, and thence through standpipe 57 controlled by valve 58 and into the hydrogen stream passing through line 43 to reactivation zone 41, or through standpipe 57 and the branch line controlled by valve 59 and into the feed stock stream passing through line 48 to reaction zone 40. As mentioned above, it may be necessary to supply a fluidizing gas such as an inert gas to the standpipes, for example, through lines 60, 61 and 62, in order to keep the catalyst therein in a freely flowing state. The amount of fluidizing gas introduced may be relatively small, for example, sufficient to give a linear velocity of about 0.05–0.1 feet per second.

On continued use, there may accumulate on the catalyst a form of coke deposit which is difficult to remove by the hydrogen treatment. Also, in some cases where catalytic activity depends on a particular state of oxidation, the catalyst cannot be maintained in a reducing atmosphere indefinitely. In such cases it is desirable to subject the catalyst to a different type of regenerative treatment, for example to an oxidative regeneration, by continuously withdrawing a portion of the catalyst from reaction zone 40 and passing it through standpipe 55 controlled by valve 63 to regeneration zone 64. Air or other oxygen-containing gas is introduced through line 65 to the bottom of the regeneration vessel and is passed through distribution grid 66 into contact with the catalyst in regeneration zone 64. Flue gas containing products of combustion is removed overhead through line 67 after entrained catalyst is removed in the cyclone assembly 68. Separated catalyst is returned to the regeneration zone through pipe 69.

Regenerated catalyst is removed from the regeneration zone 64 through standpipe 70 controlled by valve 71. Fluidizing gas may be introduced into standpipe 70 through lines 72, 73 and 74. Catalyst is discharged from the standpipe into the hydrogen stream introduced through line 42 and is carried thereby through lines 43 and 44 to zones 41 and 40. By this means the activity of the catalyst in reaction zone 40 may be maintained at the desired level.

The specific methods employed in controlling the temperature in the reaction, reactivation and regeneration zones must be chosen with regard to the heat of reaction, the deposition of coke in a form which must be removed by burning, and the concentration of oxidizable metallic constituents in the catalyst.

If a relatively large amount of heat is liberated in regeneration zone 64 by the burning of coke and metallic constituents of the catalyst, it may be desirable to withdraw a stream of catalyst from the regeneration zone and to pass it through a cooler which may be a waste heat boiler and thence back into the regeneration zone in order to control the temperature therein. The temperature should not be allowed to rise to the deactivation temperature of the catalyst being employed. Suitable temperatures of regeneration, for example, may be in the range of from 900° to 1300° F.

As described in connection with Figure 2, catalyst may be withdrawn from the reaction zone through line 55. It is generally preferred to strip the catalyst of hydrocarbons and hydrogen before passing it to an oxidative regeneration zone. For example, the catalyst may be withdrawn through line 55 from a well in the reaction zone 40 formed by a short baffle (not shown), and an inert gas such as flue gas or nitrogen may be injected into the well through a line (not shown) in order to strip the catalyst of burnable gases. Steam may sometimes be used as a stripping gas, although in the case of catalysts containing alumina, steam has a deactivating effect and should be avoided. If desired, a separate stripping zone operated under hindered settling conditions may be employed.

In the fluid powdered catalyst processes described above, it will be understood that catalyst flows through the reaction, reactivation, stripping and regeneration zones by reason of the fact that it is maintained as a dispersion of lesser density in upflow lines and zones than in the downflow standpipes, so that the back pressure exerted at the bottom of the low density side by the weight of powder therein is less than the pressure developed in the standpipes. The motive force which causes the powdered solid to circulate is obtained, of course, from the energy in the gases and vapors which are passed through the system. The invention in its broader phases is not to be limited to the particular systems which have been described. For example, whereas a powdered catalyst process employing hindered settler reactors and standpipes has been described as a preferred method, the frequent reactivation of catalysts by treatment with hydrogen is equally applicable to other types of processes such as those wherein the catalyst in the reaction zone is maintained in suspension, or wherein the catalyst is circulated by means of mechanical devices such as screw pumps rather than by standpipes.

In the operation of the process in any of the ways described above, the maintenance of a pressure in the reactivation zone between say 50 and 400 or more pounds per square inch increases the effectiveness of the hydrogen during the reactivation operation. However, when employing powdered catalyst or when reactivating very frequently in fixed bed operation, it is generally preferred from a practical standpoint to maintain a hydrogen pressure of the same order of magnitude as the total pressure used in the reaction. The reaction conditions of temperature, feed rate, type of catalyst, volume of hydrogen which may accompany the oil during the reaction and so forth may be essentially the same as those ordinarily used.

It should be understood that the principal feature of the present invention is that the contact between oil and catalyst is discontinued or substantially reduced intermittently and at very short intervals and the catalyst is treated with hydrogen to remove adsorbed polymers and to effect at least a partial saturation and vaporization of unsaturated materials which tend to dehydrogenate and polymerize further to form coke. By operating in this manner the rate at which coke is deposited on the catalyst is substantially reduced and hence the necessity for purging and regenerating the catalyst with air is much less frequent.

A further advantage is realized when the catalysts contain oxidizable metals or metal oxides or sulfides such as those employed in the reforming of naphthas, the aromatization and cyclization of selected hydrocarbon feedstocks in the production of aromatics, the dehyrogenation of naphthenes to aromatics and the dehydrogenation of paraffins and olefins such as butane to butene and butene to butadiene. Whereas the metal oxides are used generally in a reduced or partially reduced state during the reaction period, at the end of an oxidative regeneration period they are in an oxidized state and must either be reduced prior to use in the reaction zone or allowed to be reduced by oxidation of valuable feedstock. Additional facilities, time and reagents over those required for simply burning the coke must be provided to carry out both the oxidation and the reduction. Another important factor is that both burning the catalyst to the oxide during regeneration and subsequently reducing the oxide to a state of lower valence liberate considerable quantities of heat, which in the case of catalysts containing more than a few percent of catalytic metal may be many times the amount of heat liberated in burning the coke contaminants. The rate at which catalysts can be regenerated or reduced without exceeding a deactivation temperature depends on the rate of heat removal, to which there is a definite practical limit. It is evident, therefore, that the reduction in the frequency of oxidative regeneration which is achieved by the present invention is of great practical importance in reducing the size of heat exchange equipment and the amount of waste heat, and in decreasing the length of time the catalyst is off-stream which in turn decreases the number of converters required in fixed bed operation or the size of regeneration and reduction zones required in powdered catalyst operation. In fact, it is possible when employing the present invention in some processes such as the reforming of naphtha to preheat the feedstock in the product fractionator and to varporize the preheated liquid by injecting into hot powdered catalyst so that a heat balance is maintained around the plant. In the case of catalysts containing high concentrations of sulfides such as those of nickel and tungsten, regeneration may require remanufacture; in such cases the invention has great utility since by employing mild reaction conditions and reactivating frequently with hydrogen the coke deposition may be kept so low that regeneration is required only at very infrequent intervals. In such cases, the feedstock or the hydrogen stream may contain a sulfide such as hydrogen sulfide in order to prevent excessive desulfiding of the catalyst.

The following experiments illustrate the advantageous effect of intermittent operation as compared with the usual continuous operation.

*Example 1*

A virgin heavy naphtha derived from an East Texas crude is subjected to catalytic reforming in the presence of hydrogen at a temperature of about 911° F. under a pressure of 200 pounds per square inch, at a feed rate of 0.5 volume of liquid oil per hour per volume of catalyst, in the presence of a catalyst comprising Activated Alumina and molybdenum oxide, employing 1000 cubic feet of hydrogen per barrel of oil.

In one experiment the oil and hydrogen are passed over the catalyst together in a continuous manner. In another experiment the hydrogen is passed over the catalyst continuously but the oil is passed over the catalyst in 35 second periods, that is the oil is fed for 35 seconds and then shut off for 35 seconds. Reaction is conducted in each case for a period of 8 hours. The following table shows the important results obtained.

| | Continuous Operation | Intermittent Operation |
| --- | --- | --- |
| Aniline Point of Product, °F | 56 | 34 |
| Coke on Catalyst, Weight Per Cent of Feed | 0.52 | 0.30 |

It will be seen from these results that the aniline point of the product obtained in the intermittent operation is 22° F. lower than that of the product obtained in the continuous operation. In this range a reduction in aniline point of this magnitude corresponds to an increase in ASTM octane number of about 3 points. It will also be noted that the coke deposited on the catalyst in the intermittent operation is approximately 42% less than that deposited during the continuous operation.

*Example 2*

A virgin heavy naphtha derived from a West Texas crude is subjected to catalytic reforming in the presence of hydrogen at a temperature of about 960° F., under a pressure of 400 pounds per square inch, at a feed rate of 0.75 volume of liquid oil per hour per volume of catalyst, in the presence of a catalyst comprising aluminum oxide and molybdenum, employing 2600 cubic feet of hydrogen recycle gas per barrel of oil.

In one experiment the oil and hydrogen are passed over the catalyst together in a continuous manner. In another experiment the hydrogen is passed over the catalyst continuously but the oil is passed over the catalyst intermittently, employing 60 minute reaction periods separated by 30 minute hydrogen reactivation periods. Reaction is conducted in each case for a period of 6 hours and the products are analyzed. The important results are shown below:

|  | Continuous Operation | Intermittent Operation |
| --- | --- | --- |
| Aniline Point of Product, °F | 58 | 57 |
| Coke on Catalyst, Weight Per Cent on Feed | 1.0 | 1.04 |
| ASTM Octane Number | 80.2 | 80.2 |

It will be seen from the above results that under these conditions no improvement in coke formation or in product quality is obtained by the hydrogen reactivation when the reaction is allowed to continue for an hour without hydrogen reactivation.

*Example 3*

Experiments similar to those given in Example 2 are performed on a virgin heavy naphtha derived from an East Texas crude, employing equal reaction and hydrogen reactivation periods of 15 minutes in the intermittent operation. The results obtained are shown below:

|  | Continuous Operation | Intermittent Operation |
| --- | --- | --- |
| Average Temperature of Catalyst, °F | 940 | 946 |
| Aniline Point of Product, °F | 58 | 54 |
| Coke on Catalyst, Weight Per Cent on Feed | 0.39 | 0.31 |

Comparing Example 2 with Example 3, it will be seen that increasing the frequency of the hydrogen reactivation treatment from 60 minutes to 15 minute periods results in an advantage for the intermittent over the continuous operation in that the coke formation is reduced.

*Example 4*

Naphtha of the same kind as that used in the experiments of Example 1 is subjected to catalytic reforming in the presence of hydrogen at a temperature of about 911° F. under a pressure of 200 pounds per square inch, at a feed rate of 0.5 volume of liquid feed per hour per volume of catalyst, in the presence of a catalyst comprising alumina and chromia, employing 1000 cubic feet of hydrogen per barrel of oil.

In one experiment the naphtha and hydrogen are passed over the catalyst together in a continuous manner. In two other experiments the hydrogen is passed continuously and the naphtha is passed intermittently over the catalyst, employing equal hydroforming and hydrogen reactivation periods of 60 seconds in one experiment and 35 seconds in the other. The total time of reaction is 8 hours in each case. The more important results are shown in the following table.

|  | Continuous Operation | Intermittent Operation | |
| --- | --- | --- | --- |
| Hydroforming Period | 8 Hours | 60 sec | 35 sec |
| Hydrogen Reactivation Period | None | 60 sec | 35 sec |
| Aniline Point of Product, °F | 90 | 81 | 72 |
| Coke on Catalyst, Weight Per cent of Feed | 0.26 | 0.12 | 0.11 |

These results show that under these conditions the frequent reactivation of the catalyst by the hydrogen treatment results in more than a 50% reduction in coke formation and also lowers the aniline point substantially.

*Example 5*

Experiments similar to those of Examples 1 and 4 are performed in the presence of a catalyst comprising molybdenum oxide and alumina hydrate. The same feedstock is employed and the reaction conditions are the same, except that the temperature is about 917° F. and the frequency of hydrogen reactivation is increased. In one experiment, equal periods of 24 seconds are used for hydroforming and for hydrogen reactivation, and in another experiment the hydroforming is conducted for 16 seconds and the catalyst is reactivated with hydrogen for 8 seconds. The following results are obtained:

| | | |
| --- | --- | --- |
| Hydroforming Period, Seconds | 24 | 16 |
| Hydrogen Reactivation Period, Seconds | 24 | 8 |
| Aniline Point of Product, °F | 28 | 31 |
| Coke on Catalyst, Weight Percent of Feed | 0.41 | 0.42 |

These results indicate that a decrease in the length of the reaction period below 24 seconds is not justified under the particular reaction conditions employed. At a higher rate of coke formation, a higher frequency of reactivation may, of course, be desirable. It is indicated further that the removal of coke precursors from the catalyst by the hydrogen is a relatively rapid reaction when the hydrogen treatment is applied soon after the coke precursors are deposited on the catalyst, and that a relatively short reactivation period is sufficient if the condition of frequency is met.

This invention is not limited by any theories of the mechanism of the reactions nor by any details which have been given merely for purposes of illustration but is limited only in and by the following claims.

We claim:

1. The method of conducting a hydrocarbon conversion conducted in the presence of added hydrogen and a solid catalyst material at elevated temperatures which process normally results in the deposition of activity impairing contaminants on the said catalyst, which comprises forcing said oil and a hydrogen-containing gas into contact with said catalyst in a reaction zone maintained at elevated temperatures and periodically interrupting a conversion period by discontinuing the oil supply to said reaction zone at intervals of from a fraction of a second to about 15 minutes, whereby only hydrogen is forced into said zone periodically to retard deposition of coke on the catalyst.

2. A method according to claim 1 in which naphtha is reformed in the presence of molybdenum oxide on alumina at a temperature of about 911° F. and under a superatmospheric pressure.

3. In a process for the catalytic conversion of hydrocarbon oil carried out in the presence of a catalyst regenerable by oxygen which gradually loses its activity because of the deposition thereon during the conversion treatment of carbonaceous contaminants and characterized by alternate periods of reaction and regeneration by oxidation, the method of retarding the rate of deposition of carbonaceous contaminants on the catalyst which comprises maintaining a continuous stream of a gas containing free hydrogen flowing over the catalyst during the reaction period and intermittently flowing oil vapors over the catalyst for intervals of from a fraction of a second to about 15 minutes.

4. In a process for the catalytic conversion of hydrocarbon oil carried out in the presence of a catalyst regenerable by oxidation which gradually loses its activity because of the deposition thereon during the conversion treatment of carbonaceous contaminants and characterized by alternate periods of reaction and regeneration by oxidation, the method of retarding the rate of deposition of carbonaceous contaminants on the catalyst during the reaction period which comprises intermittently passing first oil vapors and then hydrogen over the catalyst during the reaction period each for intervals of from a fraction of a second to about 15 minutes.

5. A process of catalytically treating hydrocarbons and regenerating the activity of the catalyst, which process comprises the steps of contacting a mixture comprising a naphtha and hydrogen at a pressure of the order of 200 pounds per square inch and a temperature of about 911° F. with a catalyst having a coke-accumulating tendency comprising a minor amount of chromium oxide and the balance substantially aluminum oxide for a period not exceeding 15 minutes to transform the naphtha into a hydrocarbon of lesser hydrogen content, and then interrupting the flow of naphtha and continuing the flow of a hydrogen-containing gas in the absence of naphtha in contact with the catalyst for a period of not exceeding 15 minutes to reactivate the catalyst by hydrogenating unsaturated hydrocarbon compounds adsorbed on the catalyst surface and sweeping out volatile hydrocarbon materials remaining in the catalyst, and alternately repeating the above two steps over a long period of time prior to any regeneration of the catalyst with oxygen whereby the catalyst remains active for a prolonged period of time.

6. A process of catalytically treating hydrocarbons and regenerating the activity of the catalyst, which process comprises the steps of contacting a mixture comprising a naphtha and a hydrogen-containing gas under reforming conditions of temperature and pressure with a reforming catalyst having a coke-accumulating tendency for a period of time not exceeding 15 minutes to transform the naphtha into hydrocarbons of lesser hydrogen content, and then interrupting the flow of naphtha and continuing the flow of a hydrogen-containing gas in the absence of naphtha in contact with the catalyst for a period of time not exceeding 15 minutes to reactivate the catalyst, and alternately repeating the above two steps over a long period of time prior to any regeneration of the catalyst with an oxygen-containing gas whereby the catalyst remains active for a prolonged period of time.

JOHN C. MUNDAY.
EDWARD W. S. NICHOLSON.

REFERENCES CITED

The following references are of record in the file of this patent:

UNITED STATES PATENTS

| Number | Name | Date |
|---|---|---|
| 1,121,860 | Moore | Dec. 22, 1914 |
| 1,894,785 | Peck | Jan. 17, 1933 |
| 2,143,364 | Taylor | Jan. 10, 1939 |
| 2,150,923 | Houdry | Mar. 21, 1939 |
| 2,268,187 | Churchill, Jr. | Dec. 30, 1941 |
| 2,270,715 | Layng et al. | Jan. 20, 1942 |
| 2,274,988 | Matuszak | Mar. 3, 1942 |
| 2,288,336 | Welty, Jr., et al. | June 30, 1942 |
| 2,289,716 | Marschner | July 14, 1942 |
| 2,303,083 | Kuhl | Nov. 24, 1942 |
| 2,304,128 | Thomas | Dec. 8, 1942 |
| 2,312,006 | Thiele | Feb. 23, 1943 |
| 2,317,494 | Thomas | Apr. 27, 1943 |
| 2,322,863 | Marschner et al. | June 29, 1943 |
| 2,338,881 | Thomas | Jan. 11, 1944 |
| 2,339,107 | Pier et al. | Jan. 11, 1944 |
| 2,358,039 | Thomas et al. | Sept. 12, 1944 |
| 2,360,787 | Murphree | Oct. 17, 1944 |
| 2,378,342 | Voorhees et al. | June 12, 1945 |